United States Patent
Su et al.

(10) Patent No.: US 11,346,495 B2
(45) Date of Patent: May 31, 2022

(54) CONTROL METHOD FOR NON-ORTHOGONAL GIMBAL, GIMBAL THEREOF, AND STORAGE DEVICE

(71) Applicant: SZ DJI TECHNOLOGY CO., LTD., Shenzhen (CN)

(72) Inventors: Tie Su, Shenzhen (CN); Zihan Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/920,548

(22) Filed: Jul. 3, 2020

(65) Prior Publication Data
US 2020/0332944 A1   Oct. 22, 2020

Related U.S. Application Data

(63) Continuation of application No. PCT/CN2018/071686, filed on Jan. 6, 2018.

(51) Int. Cl.
  *F16M 11/12*   (2006.01)
  *F16M 11/18*   (2006.01)
  *F16M 13/04*   (2006.01)

(52) U.S. Cl.
  CPC ........... *F16M 11/121* (2013.01); *F16M 11/18* (2013.01); *F16M 13/04* (2013.01); *F16M 2200/00* (2013.01)

(58) Field of Classification Search
  CPC ...... F16M 11/121; F16M 11/18; F16M 13/04; F16M 2200/00; F16M 11/2071;
(Continued)

(56) References Cited

U.S. PATENT DOCUMENTS

| 6,751,529 B1 * | 6/2004 | Fouche | A63H 27/02 244/164 |
| 2016/0229556 A1 | 8/2016 | Zhou et al. | |

(Continued)

FOREIGN PATENT DOCUMENTS

| CN | 1569563 A | 1/2005 |
| CN | 203902846 U | 10/2014 |

(Continued)

OTHER PUBLICATIONS

Jiang R, Yang G, Zou R, Wang J, Li J. Accurate Compensation of Attitude Angle Error in a Dual-Axis Rotation Inertial Navigation System. Sensors. 2017; 17(3):615. https://doi.org/10.3390/s17030615 (Year: 2017).*

(Continued)

*Primary Examiner* — Terrell L McKinnon
*Assistant Examiner* — Ding Y Tan
(74) *Attorney, Agent, or Firm* — Anova Law Group, PLLC

(57) ABSTRACT

A control method for a non-orthogonal gimbal includes obtaining an actual attitude of the gimbal, determining a target attitude of the gimbal according to the actual attitude of the gimbal and an angle between a first rotation axis of a first drive motor and a second rotation axis of a second drive motor, determining an attitude error according to the actual attitude and the target attitude, and controlling one or more of a plurality of drive motors according to the attitude error to cause the gimbal to approach the target attitude. The gimbal includes the plurality of drive motors including the first drive motor, the second drive motor, and the third drive motor. The gimbal further includes a base, a first axis arm, a second axis arm, and a third axis arm.

20 Claims, 5 Drawing Sheets

(58) Field of Classification Search
CPC .... F16M 11/10; F16M 13/00; F16M 11/2035; F16M 11/123; F16M 2200/041; G03B 17/561; G03B 17/563; H04N 5/2328; H04N 5/23248
See application file for complete search history.

(56) References Cited

U.S. PATENT DOCUMENTS

| | | | | |
|---|---|---|---|---|
| 2016/0381271 | A1* | 12/2016 | Cheng | F16M 13/00 348/208.2 |
| 2017/0106998 | A1* | 4/2017 | Zhou | F16M 11/10 |
| 2018/0115716 | A1* | 4/2018 | Gubler | H04N 5/23258 |
| 2019/0063668 | A1* | 2/2019 | Wei | F16M 11/2035 |
| 2019/0364212 | A1* | 11/2019 | Gubler | H04N 5/23206 |

FOREIGN PATENT DOCUMENTS

| | | | | |
|---|---|---|---|---|
| CN | 104508346 A | * | 4/2015 | ........... H04N 5/2328 |
| CN | 106051400 A | | 10/2016 | |
| CN | 106375720 A | | 2/2017 | |
| CN | 107223220 A | | 9/2017 | |
| CN | 107339569 A | * | 11/2017 | ......... F16M 11/2071 |
| CN | 107339569 A | | 11/2017 | |
| CN | 107466385 A | | 12/2017 | |
| WO | WO-2015085499 A1 | * | 6/2015 | ........... G03B 15/006 |

OTHER PUBLICATIONS

The World Intellectual Property Organization (WIPO), International Search Report for PCT/CN2018/071686, dated Oct. 10, 2018, 7 pages.

* cited by examiner

- S31 Obtain the actual attitude of the gimbal
- S32 Obtain the target attitude of the gimbal
- S33 Determine the attitude error according to the actual attitude of the gimbal and the target attitude of the gimbal
- S34 Control the drive motors according to the attitude error to cause the actual attitude of the gimbal to approach the target attitude of the gimbal

CONTROL METHOD FOR NON-ORTHOGONAL GIMBAL, GIMBAL THEREOF, AND STORAGE DEVICE

CROSS-REFERENCE TO RELATED APPLICATION

This application is a continuation of International Application No. PCT/CN2018/071686, filed Jan. 6, 2018, the entire content of which is incorporated herein by reference.

TECHNICAL FIELD

The present disclosure relates to control technology field and, more particularly, to a control method for a non-orthogonal gimbal, a gimbal, and a storage device.

BACKGROUND

A gimbal is a system to increase a stability of a payload. For example, users use the gimbal to fix a camera to increase the stability of the camera, so that pictures with good stability can be captured under moving conditions.

During a control process of the gimbal, attitude control of the payload can be realized by controlling an attitude of the gimbal. However, the current control strategy of the gimbal mainly focuses on the conventional orthogonal gimbal, and it is not suitable for a non-orthogonal gimbal. Therefore, the control strategy for the non-orthogonal gimbal is currently a very important research topic.

SUMMARY

In accordance with the present disclosure, there is provided a control method for a non-orthogonal gimbal. The gimbal includes a plurality of drive motors including a first drive motor, a second drive motor, and a third drive motor. The gimbal further includes a base, a first axis arm rotatably coupled to the base through the first drive motor, a second axis arm rotatably coupled to the first axis arm through the second drive motor, and a third axis arm rotatably coupled to the second axis arm through the third drive motor and configured to carry a load. The method includes obtaining an actual attitude of the gimbal, determining a target attitude of the gimbal according to the actual attitude of the gimbal and an angle between a first rotation axis of the first drive motor and a second rotation axis of the second drive motor, determining an attitude error according to the actual attitude and the target attitude, and controlling one or more of the plurality of drive motors according to the attitude error to cause the gimbal to approach the target attitude. The angle between the first rotation axis and the second rotation axis is not a right angle.

In accordance with the present disclosure, there is provided a non-orthogonal gimbal. The gimbal includes a plurality of drive motors, a base, a first axis arm, a second axis arm, a third axis arm, a memory storing program instructions, and a processor. The plurality of drive motors includes a first drive motor, a second drive motor, and a third drive motor. The first axis arm is rotatably coupled to the base through the first drive motor. The first drive motor has a first rotation axis. The second axis arm is rotatably coupled to the first axis arm through the second drive motor. The second drive motor has a second rotation axis being non-orthogonal to the first rotation axis. The third axis arm is rotatably coupled to the second axis arm through the third drive motor. The processor is configured to execute the program instructions to obtain an actual attitude of the gimbal, determine a target attitude of the gimbal according to the actual attitude of the gimbal and an angle between the first rotation axis and the second rotation axis, determine an attitude error according to the actual attitude and the target attitude, and control one or more of the plurality of drive motors according to the attitude error to cause the gimbal to approach the target attitude.

In the technical solution above, with the attitude error between the actual attitude of the non-orthogonal gimbal and the target attitude, and according to the attitude error, the drive motor of the non-orthogonal gimbal is controlled to approach the actual attitude of the non-orthogonal gimbal to the target attitude. That is, the closed-loop control method includes implementing the attitude control of the non-orthogonal gimbal. By considering the non-right-angle between the rotation axis of the first drive motor and the rotation axis of the second drive motor of the non-orthogonal gimbal, the target attitude and control value of the drive motor are determined in conjunction with the angle to control the non-orthogonal gimbal accurately and effectively.

DETAILED DESCRIPTION OF THE EMBODIMENTS

To better understand the technical solutions of the present disclosure, embodiments of the present disclosure are described in detail in connection with the reference drawings as follows.

In embodiments of the disclosure, the terms are merely aimed to describe specific embodiments, but are not used to limit the disclosure. The singular forms of "a," "the," or "this" used in embodiments of the disclosure and in the claims are also intended to include plural forms, unless the context clearly indicates otherwise. The term "and/or" as used herein refers to and includes any or all possible combinations of one or more of the associated listed items.

To facilitate understanding, a structure of a non-orthogonal gimbal will be described with examples.

Figure 1:
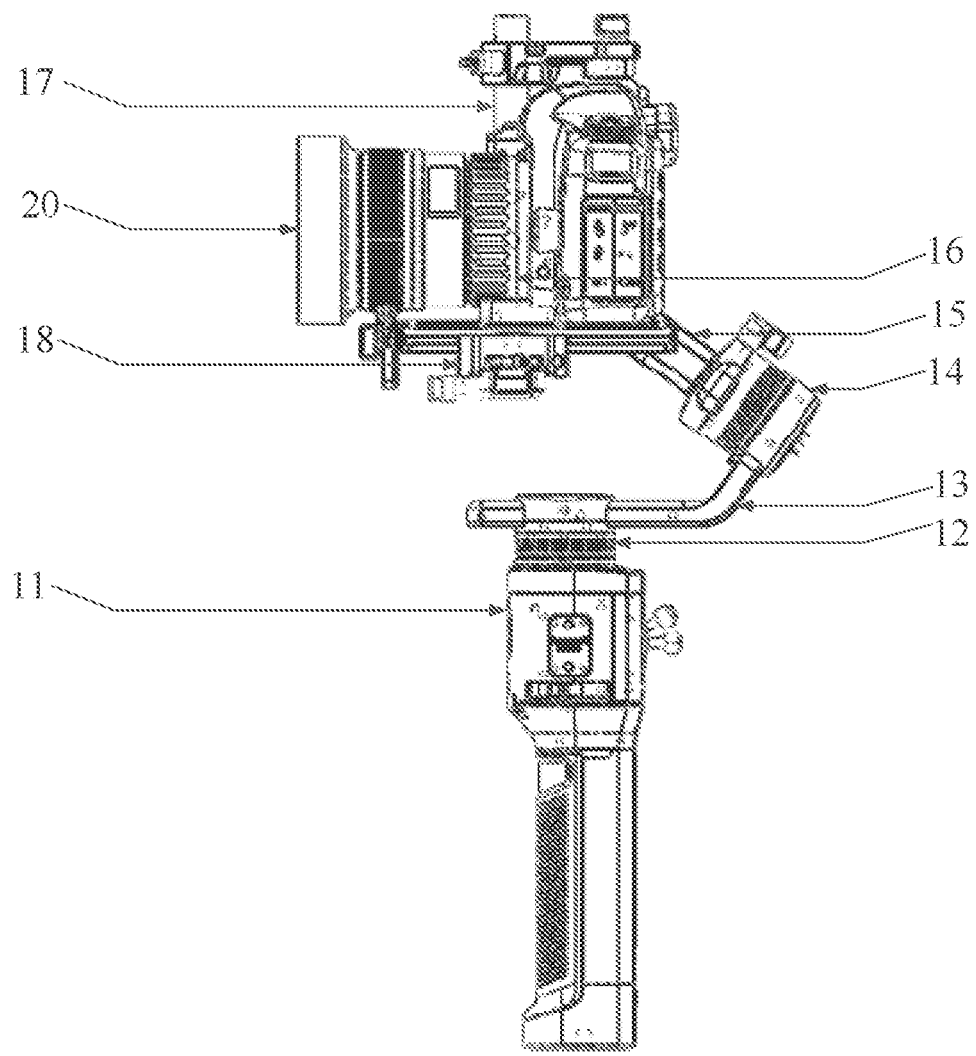
FIG. 1 is a schematic diagram of a non-orthogonal gimbal structure according to an embodiment of the disclosure.

FIG. 1 is a schematic diagram of a non-orthogonal gimbal structure consistent with an embodiment of the disclosure.

The gimbal is configured to carry a payload 20, and includes a base 11, a first drive motor 12, a first axis arm 13 rotatably connected to the base 11 through the first drive motor 12, a second drive motor 14, a second axis arm 15 rotatably connected to the first axis arm 13 through the second drive motor 14, a third drive motor 16, and a third axis arm 17 rotatably connected to the second axis arm 15 through the third drive motor 16 and configured to carry the payload 20.

Figures 2, 3:
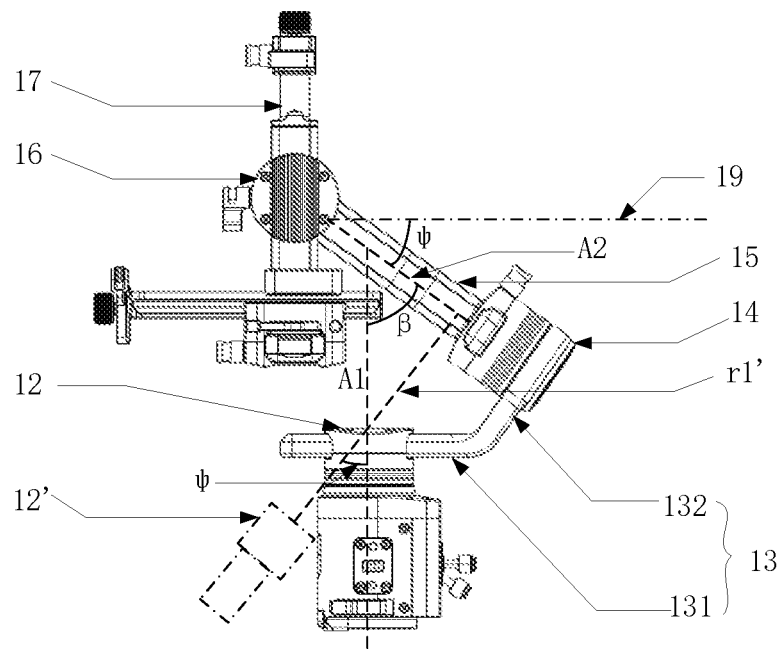
FIG. 2 is a schematic diagram of a partial structure of a non-orthogonal gimbal according to an embodiment of the disclosure.
FIG. 3 is a schematic flowchart of a control method of a non-orthogonal gimbal according to an embodiment of the disclosure.

The rotation axis of the first drive motor 12 and the rotation axis of the second drive motor 14 are non-orthogonal, i.e., not perpendicular to each other. As shown in FIG. 2, the rotation axis A1 of the first drive motor 12 and the rotation axis A2 of the second drive motor 14 form an angle $\beta$, which is a non-right-angle. The angle $\beta$ may be, but is not limited to, any angle greater than 0° and less than 90°, such as 55°.

Each one of the first drive motor 12, the second drive motor 14, and the third drive motor 16 is provided with an angle sensor to measure a joint angle of each drive motor. The angle sensor may be at least one of a potentiometer, a hall sensor, or a photoelectric encoder. In some embodiments, the zero position of the third drive motor 16 of the gimbal may be defined, but is not limited to, as follows: when the joint angle of the third drive motor 16 is at the zero position, that is, when the joint angle of the third drive motor 16 is 0°, a partial axis arm of the third axis arm 17 that is connected to the third drive motor 16 is orthogonal to a partial axis arm of the second axis arm 15 that is connected to the third drive motor 16.

In some embodiments, the first drive motor 12 is configured to drive the first axis arm 13 to rotate around the rotation axis of the first drive motor 12, the second drive motor 14 is configured to drive the second axis arm 15 to rotate around the rotation axis of the second drive motor 14, and the third drive motor 16 is configured to drive the third axis arm 17 to rotate around the rotation axis of the third drive motor 16. An attitude of the payload 20 can be adjusted in the corresponding directions through the rotations of the corresponding axis arms driven by the drive motors described above. In practical applications, the pitch, roll, and yaw movements of the payload 20, i.e., the attitude of the payload 20, are controlled by controlling the three drive motors. The above-described drive motors may be brushless motors.

The shapes of the first axis arm 13, the second axis arm 15, and the third axis arm 17 can be configured according to actual situations. As shown in FIG. 2, the first axis arm 13 is a transverse axis arm of a bending structure formed by a first axis arm part 131 and a second axis arm part 132.

The third axis arm 17 may carry one or more payloads 20. The payload 20 may be a photographing device (e.g., a camera, etc.). In some embodiments, the gimbal may further include a payload fixing mechanism 18, and the payload 20 is fixed to the gimbal through the payload fixing mechanism 18. For example, the payload fixing mechanism 18 may be rigidly connected to the third axis arm 17.

To obtain the actual attitude of the gimbal, the gimbal is provided with an attitude measurement device such as an inertial measurement unit (IMU) or a gyroscope. The attitude measurement device may, but is not limited to, be arranged in the payload fixing mechanism 18.

The above-described gimbal can be configured for hand-holding or being mounted at a movable platform. For example, when the gimbal is configured for hand-holding, the base 11 is configured for the user to hold; while when the gimbal is configured for being mounted at a movable platform, the base 11 is configured to be mounted at the movable platform. The platform may include an unmanned aerial vehicle (UAV), a remote-control vehicle, an unmanned vehicle, etc.

Compared to an orthogonal gimbal, the second drive motor, the second axis arm, or the first axis arm of the non-orthogonal gimbal described above will not block the payload.

FIG. 3 is a schematic flowchart of a control method of a non-orthogonal gimbal consistent with an embodiment of the disclosure. The control method can be used to control the non-orthogonal gimbal described above and includes the following processes.

At S31, the actual attitude of the gimbal is obtained.

In some embodiments, the actual attitude of the gimbal is the actual attitude of the payload carried by the gimbal and may be measured by a measurement device such as an IMU or a gyroscope at the gimbal. For example, the angular velocity of the gimbal can be measured by the gyroscope, and the current actual attitude can be obtained by integrating the angular velocity. The measured actual attitude can be attitude data at the geodetic coordinate system.

At S32, the target attitude of the gimbal is obtained.

In some embodiments, when a user hand holds the base to operate the gimbal to change the attitude of the payload carried by the gimbal, for example, when the gimbal is in a following mode, the gimbal needs to follow a user's operation to change the actual attitude. In the process of changing the actual attitude, the gimbal needs to determine the target attitude of the gimbal. The target attitude of the gimbal is also the target attitude of the payload carried by the gimbal. The target attitude of the gimbal can also be determined according to the control instruction (such as the value of the joystick of the remote control) sent by the control device for controlling the gimbal, which is not limited here.

In some embodiments, the target attitude of the gimbal may be determined according to the actual attitude of the gimbal and the angle $\beta$ between the rotation axis of the first drive motor and the rotation axis of the second drive motor. The process to determine the target attitude of the gimbal according to the actual attitude of the gimbal and the angle $\beta$ between the rotation axis of the first drive motor and the rotation axis of the second drive motor will be described in detail as follows, which is not described here in detail.

At S33, the attitude error is determined according to the actual attitude of the gimbal and the target attitude of the gimbal.

According to the comparison between the actual attitude and the target attitude of the gimbal, the current attitude error of the gimbal can be determined. The difference between the actual attitude and the corresponding target attitude is the attitude error. The attitude error can be expressed using quaternions or Euler angles.

At S34, the drive motors are controlled according to the attitude error to cause the actual attitude of the gimbal to approach the target attitude of the gimbal.

In some embodiments, after the attitude error is determined, it is possible to know how much the current actual attitude differs from the target attitude. Control objects of the gimbal are controlled in a closed-loop according to the attitude error, that is, one or more of the first drive motor, the second drive motor, and the third drive motor of the gimbal are controlled to rotate according to the attitude error to cause the actual attitude of the gimbal to approach the target attitude, i.e., to drive the gimbal to move according to the attitude error such that the attitude of the gimbal approaches the target attitude.

In some embodiments, a joint angle error of the drive motor may be determined according to the obtained attitude error, and the corresponding drive motor is controlled according to the joint angle error to cause the actual attitude of the gimbal to approach the target attitude. In some embodiments, the attitude error is the error of the gimbal attitude. The drive motors are the control objects of the gimbal. The attitude error needs to be converted into the control error of the drive motor, that is, the joint angle error. The gimbal can control one or more of the first drive motor, the second drive motor, and the third drive motor to rotate according to the joint angle error obtained by converting the attitude error to cause the actual attitude of the gimbal to approach the target attitude. Further, the joint angle error may be determined according to the attitude error and the angle β between the rotation axis of the first drive motor and the rotation axis of the second drive motor, and the drive motor is controlled according to the joint angle error to cause the actual attitude of the gimbal to approach the target attitude.

In some embodiments, the drive motor may be controlled according to the attitude error and the angle β between the rotation axis of the first drive motor and the rotation axis of the second drive motor to cause the actual attitude of the gimbal to approach the target attitude of the gimbal. In some embodiments, since the gimbal of the present disclosure is a non-orthogonal gimbal, the rotation axis of the first drive motor and the rotation axis of the second drive motor are no longer orthogonal, and the control strategy of the original orthogonal gimbal is not suitable for the non-orthogonal gimbal of the present disclosure. For the non-orthogonal gimbal of the disclosure, the angle β between the rotation axis of the first drive motor and the rotation axis of the second drive motor will affect the control of the gimbal, that is, the angle β between the rotation axis of the first drive motor and the rotation axis of the second drive motor will affect the control of one or more of the first drive motor, the second drive motor, and the third drive motor to rotate. Therefore, besides the attitude error, the one or more of the first drive motor, the second drive motor, and the third drive motor to rotate are also controlled according to the angle β to cause the actual attitude of the gimbal to approach the target attitude. Further, according to the attitude error and the angle β, the joint angle error of the drive motor can be determined, and then according to the joint angle error, the drive motor is controlled to cause the actual attitude of the gimbal to approach the target attitude.

Figure 4:
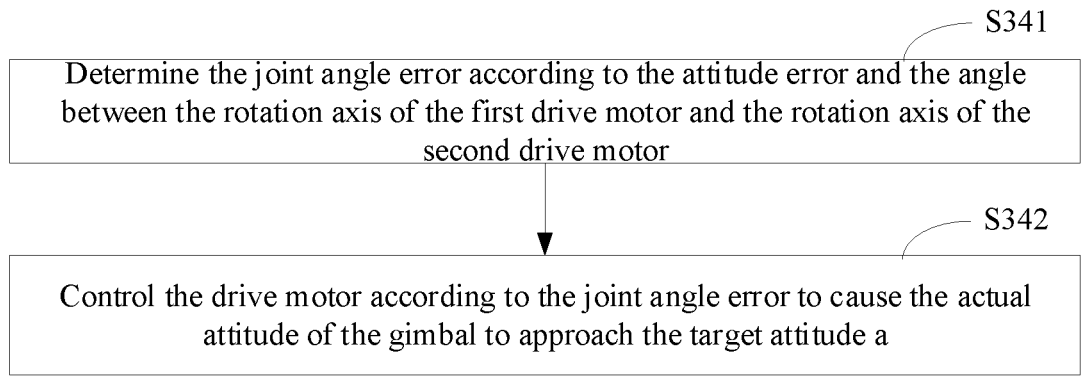
FIG. 4 is a schematic flowchart of a control method of a non-orthogonal gimbal according to another embodiment of the disclosure.

In some embodiments, as shown in FIG. 4, S34 includes the following sub-processes.

At S341, the joint angle error is determined according to the attitude error and the angle β between the rotation axis of the first drive motor and the rotation axis of the second drive motor.

For example, the joint angles of the second drive motor and the third drive motor can be obtained individually. The joint angles of the second drive motor and the third drive motor can be measured by the angle sensors (e.g., angle sensors are configured at the corresponding axes of the drive motors) at the gimbal. An attitude error conversion parameter can be determined according to the joint angles of the second drive motor or the third drive motor, and the angle β between the rotation axis of the first drive motor and the rotation axis of the second drive motor. The attitude error conversion parameter is used to convert the attitude error to the joint angle error. In some embodiments, after the attitude error conversion parameter is determined, the attitude error can be converted to the joint angle error according to the attitude error conversion parameter. The attitude error conversion parameter may be a matrix.

In some embodiments, determining the attitude error conversion parameter according to the joint angles of the second drive motor and the third drive motor and the angle β between the rotation axis of the first drive motor and the rotation axis of the second drive motor includes determining the joint angle error conversion parameter according to the joint angles of the second drive motor and the third drive motor and the angle β between the rotation axis of the first drive motor and the rotation axis of the second drive motor, and determining the attitude error conversion parameter according to the joint angle error conversion parameter, where the joint angle error conversion parameter is used to convert the joint angle error to the attitude error. In some embodiments, to convert the joint angle error to the attitude error and to convert the attitude error to the joint angle error are two reversible conversion processes, thus the joint angle error conversion parameter and the attitude error conversion parameter are two parameters of the two reversible conversion processes, so that the attitude error conversion parameter can be determined according to the joint angle error conversion parameter. The joint angle error conversion parameter can be determined according to the joint angles of the second drive motor and the third drive motor and the angle β, and with the conversion relationship between the joint angle error conversion parameter and the attitude error conversion parameter, the attitude error conversion parameter can be obtained according to the joint angle error conversion parameter. As previously described, the attitude error conversion parameter may be a matrix, the joint angle error conversion parameter may also be a matrix, and the attitude error conversion parameter and the joint angle error conversion parameter are mutual inverse matrices.

In some embodiments, the joint angle error conversion parameter may include a conversion parameter component of the joint angle error corresponding to each drive motor of the gimbal, that is, the joint angle error conversion parameter includes a first joint angle error conversion parameter component, a second joint angle error conversion parameter component, and a third joint angle error conversion parameter component. The first joint angle error conversion parameter component is used to convert the joint angle error of the third drive motor of the gimbal into an attitude error of the payload, the second joint angle error conversion parameter component is used to convert the joint angle error of the second drive motor of the gimbal into the attitude error of the payload, and the third joint angle error conversion parameter component is used to convert the joint angle error of the first drive motor of the gimbal into the attitude error of the payload. In some embodiments, the second joint angle error conversion parameter component may be determined according to the joint angle of the third drive motor, the third joint angle error conversion parameter component may be determined according to the joint angle of the second drive motor, the joint angle of the third drive motor, and the angle β. The process for determining the joint angle error conversion parameter will be described in detail below and is not described here in detail.

At S342, the drive motor is controlled according to the joint angle error to cause the actual attitude of the gimbal to approach the target attitude.

In practical applications, the attitude of the gimbal can include three sub-attitudes, i.e., a pitch attitude, a roll attitude, and a yaw attitude. Therefore, the one or more drive motors can be controlled according to the joint angle error to cause the actual pitch attitude of the gimbal to approach the target pitch attitude, cause the actual roll attitude to approach the target roll attitude, and to cause the actual yaw attitude to approach the target yaw attitude.

The process for determining the joint angle error conversion parameter according to the joint angle of the second drive motor and the third drive motor, and the angle β between the rotation axis of the first drive motor and the rotation axis of the second drive motor, the process for determining the attitude error conversion parameter according to the joint angle error conversion parameter, and the process for determining the joint angle error according to the attitude error and the attitude error conversion parameter are described in detail below.

Figure 5:
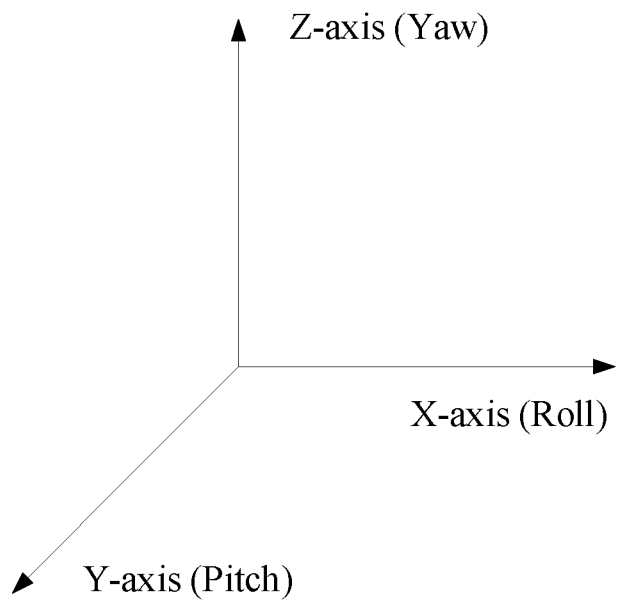
FIG. 5 is a schematic diagram of a 3D coordinate system established by an orthogonal gimbal in an application scenario of the disclosure.

For a three-axis orthogonal gimbal, as shown in FIG. 5, an X-axis may be the roll axis of the gimbal, a Y-axis may be the pitch axis of the gimbal, and a Z-axis may be the yaw axis of the gimbal, then:

the rotation matrix around the X-axis is $R_1(\alpha_1) = \begin{bmatrix} 1 & 0 & 0 \\ 0 & \cos\alpha_1 & \sin\alpha_1 \\ 0 & -\sin\alpha_1 & \cos\alpha_1 \end{bmatrix}$;

the rotation matrix around the Y-axis is $R_2(\alpha_2) = \begin{bmatrix} \cos\alpha_2 & 0 & \sin\alpha_2 \\ 0 & 1 & 0 \\ \sin\alpha_2 & 0 & \cos\alpha_2 \end{bmatrix}$;

the rotation matrix around the Z-axis is $R_3(\alpha_3) = \begin{bmatrix} \cos\alpha_3 & \sin\alpha_3 & 0 \\ -\sin\alpha_3 & \cos\alpha_3 & 0 \\ 0 & 0 & 1 \end{bmatrix}$.

$\alpha_1$, $\alpha_2$, and $\alpha_3$ denote the joint angles of the drive motors corresponding to the X-axis, the Y-axis, and the Z-axis, respectively. For the orthogonal gimbal, since the Y-axis drive motor of the Y-axis is rigidly connected to the payload, the attitude error $S_1$ of the payload caused by the joint angle error $r_1$ of the Y-axis drive motor can be expressed as $$S_1 = \begin{bmatrix} 0 \\ 1 \\ 0 \end{bmatrix} r_1 = M_1 r_1,$$

the joint angle error $r_2$ of the X-axis drive motor needs to rotate around the rotation axis of the Y-axis drive motor, thus the attitude error $S_2$ of the payload caused by the joint angle error $r_2$ of the X-axis drive motor can be expressed as $$S_2 = R_2(\alpha_2)\begin{bmatrix} 1 \\ 0 \\ 0 \end{bmatrix} r_2 = M_2 r_2,$$

the joint angle error $r_3$ of the Z-axis drive motor needs to rotate around the rotation axis of the X-axis drive motor and rotate around the rotation axis of the Y-axis drive motor, thus the attitude error $S_3$ of the payload caused by the joint angle error $r_3$ of the X-axis drive motor can be expressed as $$S_3 = R_2(\alpha_2)R_1(\alpha_1)\begin{bmatrix} 0 \\ 0 \\ 1 \end{bmatrix} r_3 = M_3 r_3.$$

Therefore, for the orthogonal gimbal, the joint angle error conversion parameter used to convert the joint angle error into the attitude error is $M=(M_1\ M_2\ M_3)$. Since converting the joint angle error into the attitude error and converting the attitude error into the joint angle error are two reversible conversion processes, the attitude error conversion parameter used to convert the attitude error into the joint angle error is $M^{-1}$.

For the non-orthogonal gimbal of the present disclosure, with reference to FIG. 2, $\alpha_1$ denotes the joint angle of the second drive motor, $\alpha_2$ denotes the joint angle of the third drive motor, and $\alpha_3$ denotes the joint angle of the first drive motor.

Since the third drive motor is rigidly connected to the payload, no mapping transformation is needed, and the first joint angle error conversion parameter component can be expressed as a matrix $$DCM_1 = \begin{bmatrix} 0 \\ 1 \\ 0 \end{bmatrix}.$$

Since the joint angle error of the second drive motor undergoes a rotation around the rotation axis of the third drive motor, the second joint angle error conversion parameter component can be expressed as a matrix $$DCM_2 = R_2(\alpha_2) * \begin{bmatrix} 1 \\ 0 \\ 0 \end{bmatrix}.$$

Since the first drive motor is connected to the payload through the second drive motor and the third drive motor, and the rotation axis of the first drive motor of the non-orthogonal gimbal is tilted by an angle φ relative to the corresponding rotation axis of the drive motor (as shown in FIG. 2, drive motor 12', rotation axis A1') of the orthogonal gimbal. φ is the complementary angle of the angle β between the rotation axis of the first drive motor and the rotation axis of the second drive motor of the non-orthogonal gimbal. That is, the joint angle error of the first drive motor is rotated by φ around the Y-axis, and then rotated by the second drive motor and the third drive motor in sequence, so the third joint angle error conversion parameter component can be expressed as a matrix $$DCM_3 = R_2(\alpha_2) * R_1(\alpha_1) * R_2(\varphi) * \begin{bmatrix} 0 \\ 0 \\ 1 \end{bmatrix},$$

where, $$R_2(\varphi) = \begin{bmatrix} \cos\varphi & 0 & \sin\varphi \\ 0 & 1 & 0 \\ \sin\varphi & 0 & \cos\varphi \end{bmatrix}.$$

Therefore, with the joint angle $\alpha_1$ of the second drive motor, the joint angle $\alpha_2$ of the third drive motor, and the angle β between the rotation axis of the first drive motor and the rotation axis of the second drive motor, the joint angle error conversion parameter can be determined as DCM= (DCM$_1$ DCM$_2$ DCM$_3$).

Correspondingly, the attitude error conversion parameter DCM$^{-1}$ can be determined according to the joint angle error conversion parameter. The attitude error conversion parameter includes a first attitude error conversion parameter component, a second attitude error conversion parameter component, and a third attitude error conversion parameter component, where the first attitude error conversion parameter component, the second attitude error conversion parameter component, and the third attitude error conversion parameter component are three column vectors of the DCM$^{-1}$.

According to the actual attitude and target attitude, the attitude error is determined $$b = \begin{bmatrix} b_x \\ b_y \\ b_z \end{bmatrix}.$$

Multiplying the attitude error b by the attitude error conversion parameter DCM$^{-1}$ results in the joint angle error $$r = \begin{bmatrix} r_x \\ r_y \\ r_z \end{bmatrix}.$$

$b_x$ and $r_x$ denote the attitude error and the joint angle error, respectively, associated with rotation around the rotation axis of the second drive motor, $b_y$ and $r_y$ denote the attitude error and the joint angle error, respectively, associated with rotation around the rotation axis of the third drive motor, and $b_z$ and $r_z$ denote the attitude error and the joint angle error, respectively, associated with rotation around the rotation axis of the first drive motor.

After the joint angle error is obtained, the first drive motor of the gimbal is controlled to compensate for the joint angle error $r_z$, the second drive motor of the gimbal is controlled to compensate for the joint angle error $r_x$, and the third drive motor of the gimbal is controlled to compensate for the joint angle error $r_y$, so as to eliminate the attitude error at each axis, so that the actual attitude approaches the target attitude.

Figure 6:
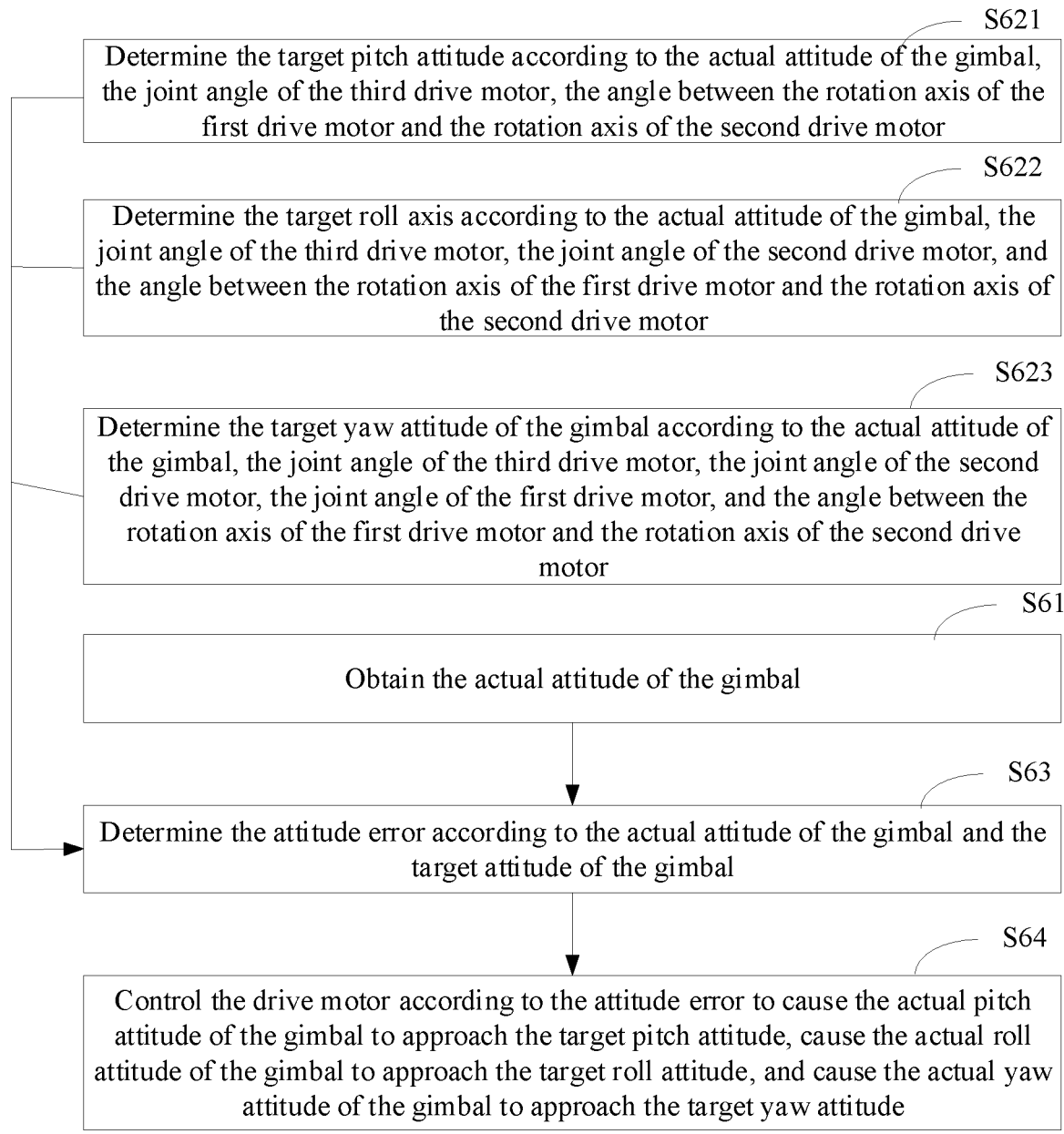
FIG. 6 is a schematic flowchart of a control method of a non-orthogonal gimbal according to an embodiment of the disclosure.

FIG. 6 is a schematic flowchart of a control method of a non-orthogonal gimbal consistent with an embodiment of the disclosure. The method includes the following processes.

At S61, the actual attitude of the gimbal is obtained.

For a detailed description of S61, reference can be made to the relevant description of S31 above.

In some embodiments, the actual attitude of the gimbal obtained at S61 includes the actual pitch attitude, the actual roll attitude, and the actual yaw attitude. Correspondingly, the target attitude of the gimbal also includes the target pitch attitude, the target roll attitude, and the target yaw attitude, and can be obtained. In some embodiments, as shown in FIG. 6, determining the target attitude includes the following sub-processes S621-S623.

At S621, the target pitch attitude is determined according to the actual attitude of the gimbal, the joint angle of the third drive motor, the angle between the rotation axis of the first drive motor, and the rotation axis of the second drive motor.

In some embodiments, according to the actual attitude of the gimbal, and the joint angle of the third drive motor, the actual attitude of the second axis arm is determined, and then according to the actual attitude of the second axis arm and the angle β between the rotation axis of the first drive motor and the rotation axis of the second drive motor, the target pitch attitude of the gimbal is determined.

For example, the joint angle of the third drive motor is obtained by an angle sensor corresponding to the third drive motor of the gimbal, and the joint angle is converted into a quaternion $q_1$, and a quaternion $q_2$ indicating the actual attitude of the gimbal is obtained at S61. The quaternion $q_1$ is multiplied by the quaternion $q_2$ to obtain the actual attitude of the second axis arm. As shown in FIG. 2, the target pitch attitude of the gimbal is the actual pitch attitude of the actual attitude of a reference axis arm 19. The reference axis arm 19 is a virtual axis arm formed by rotating the second axis arm around the rotation axis of the third drive motor by angle φ. The angle φ is the complementary angle of the angle β between the rotation axis of the first drive motor and the rotation axis of the second drive motor. When the user selects the gimbal to follow in the pitch direction, the actual pitch attitude of the payload may follow the actual pitch attitude of the actual attitude of the reference axis arm 19, that is, the target pitch attitude of the gimbal may be the actual pitch attitude of the actual attitude of the reference axis arm 19. Therefore, after the actual attitude of the second axis arm is obtained, the actual attitude of the second axis arm may be multiplied by the conversion parameter (e.g., the rotation matrix $R_2$ (φ), the relevant description of the embodiments shown in FIGS. 4 and 5 can be referred to for details thereof) determined by the angle φ to obtain the actual attitude of the reference axis arm. The pitch attitude included in the actual attitude of the reference axis arm is determined as the target pitch attitude of the gimbal.

At S622, the target roll axis is determined according to the actual attitude of the gimbal, the joint angle of the third drive motor, the joint angle of the second drive motor, and the angle between the rotation axis of the first drive motor and the rotation axis of the second drive motor.

In some embodiments, an actual attitude of a partial axis arm of the first axis arm connected to the first drive motor is determined according to the actual attitude of the gimbal, the joint angle of the third drive motor, the joint angle of the second drive motor, and the angle β between the rotation axis of the first drive motor and the rotation axis of the second drive motor. The target roll attitude is the roll attitude of the actual attitude of the partial axis arm.

As shown in FIG. 2, the first axis arm 13 includes a first axis arm part 131 and a second axis arm part 132. The first axis arm part 131 is the partial axis arm of the first axis arm 13 connected to the first drive motor, and the second axis arm part 132 is the partial axis arm of the first axis arm 13 connected to the second drive motor 14. Therefore, the angle sensors corresponding to the third drive motor and the second drive motor of the gimbal can obtain the joint angle of the third drive motor and the joint angle of the second drive motor, respectively, and convert the two obtained joint angles into the quaternions $q_1$ and $q_3$. The quaternion $q_2$ representing the actual attitude of the gimbal is obtained at S61. The above quaternions $q_1$, $q_2$, and $q_3$ are multiplied to obtain the actual attitude of the second axis arm part 132. Since the first axis arm part 131 is equivalent to the second axis arm part 132 being rotated by the angle β around the rotation axis of the third drive motor, after the actual attitude of the second axis arm part 132 is obtained, the actual attitude of the second axis arm part 132 can be multiplied by the conversion parameter (e.g., the rotation matrix $R_2(\beta)$) determined by the angle $\beta$ to obtain the actual attitude of the first axis arm part 131. As shown in FIG. 2, the actual attitude of the first axis arm part 131 may be the actual attitude obtained by rotating the actual attitude of the second axis arm part 132 around the rotation axis of the third drive motor by angle $\beta$. When the user selects the gimbal to follow in a roll direction, the actual roll attitude of the payload may follow the actual roll attitude of the actual attitude of the axis arm 131, that is, the target roll attitude of the gimbal may be the actual roll attitude of the actual attitude of the first axis arm part 131. Therefore, the actual roll attitude of the actual attitude of the first axis arm part 131 is determined to be the target roll attitude of the gimbal.

Since the first axis arm part 131 and the second axis arm part 132 of the first axis arm 13 have the same actual roll attitude, the actual attitude of the second axis arm part 132 can be directly determined according to the actual attitude of the gimbal, the joint angle of the third drive motor, and the joint angle of the second drive motor, and the roll attitude of the actual attitude of the second axis arm part 132 is used as the target roll attitude of the gimbal.

At S623, the target yaw attitude of the gimbal is determined according to the actual attitude of the gimbal, the joint angle of the third drive motor, the joint angle of the second drive motor, the joint angle of the first drive motor, and the angle between the rotation axis of the first drive motor and the rotation axis of the second drive motor.

In some embodiments, the actual attitude of the base of the gimbal can be determined according to the actual attitude of the gimbal, the joint angle of the third drive motor, the joint angle of the second drive motor, the joint angle of the first drive motor, and the angle $\beta$ between the rotation axis of the first drive motor and the rotation axis of the second drive motor. The target yaw attitude is the actual yaw attitude of the actual attitude of the base.

Referring again to FIG. 2, the angle sensors corresponding to the drive motors at the axes of the gimbal are used to obtain the joint angle of the third drive motor, the joint angle of the second drive motor, and the joint angle of the first drive motor. The actual attitude of the axis arm 131 of the first axis arm is determined according to the actual attitude of the gimbal, the joint angle of the third drive motor, the joint angle of the second drive motor, and the angle between the rotation axis of the first drive motor and the rotation axis of the second drive motor. The actual attitude of the base of the gimbal can be determined according to the actual attitude of the axis arm 131 and the joint angle of the first drive motor. In some embodiments, the actual attitude of the base 11 is the actual attitude obtained by rotating the actual attitude of the axis arm 131 around the rotation axis of the first drive motor. When the user chooses the gimbal to follow in the yaw direction, the actual yaw attitude of the payload may follow the actual yaw attitude of the actual attitude of the base 11, that is, the target yaw attitude of the gimbal may be the actual yaw attitude of the actual attitude of the base 11. The yaw attitude included in the actual attitude of the base 11 of the non-orthogonal gimbal is determined as the target yaw attitude of the gimbal.

At S63, the attitude error is determined according to the actual attitude of the gimbal and the target attitude of the gimbal.

For example, the actual pitch attitude of the gimbal is compared with the target pitch attitude to determine the pitch attitude error $b_y$, the actual roll attitude of the gimbal is compared with the target roll attitude to determine the roll attitude error $b_x$, and the actual yaw attitude of the gimbal is compared with the target yaw attitude to determine the yaw attitude error $b_z$.

At S64, the drive motors are controlled according to the attitude error to cause the actual pitch attitude of the gimbal to approach the target pitch attitude, cause the actual roll attitude of the gimbal to approach the target roll attitude, and cause the actual yaw attitude of the gimbal to approach the target yaw attitude.

In some other embodiments, the target attitude of the gimbal obtained at S621-S623 may only include one or two of the corresponding pitch attitude, roll attitude, and yaw attitude. Correspondingly, some processes of S621-S623 can be chosen to be executed to obtain the corresponding target attitude(s), so as to obtain the corresponding attitude error. The drive motor can be controlled according to the corresponding attitude error to control the corresponding actual attitude of the gimbal to approach the corresponding target attitude.

Figure 7:
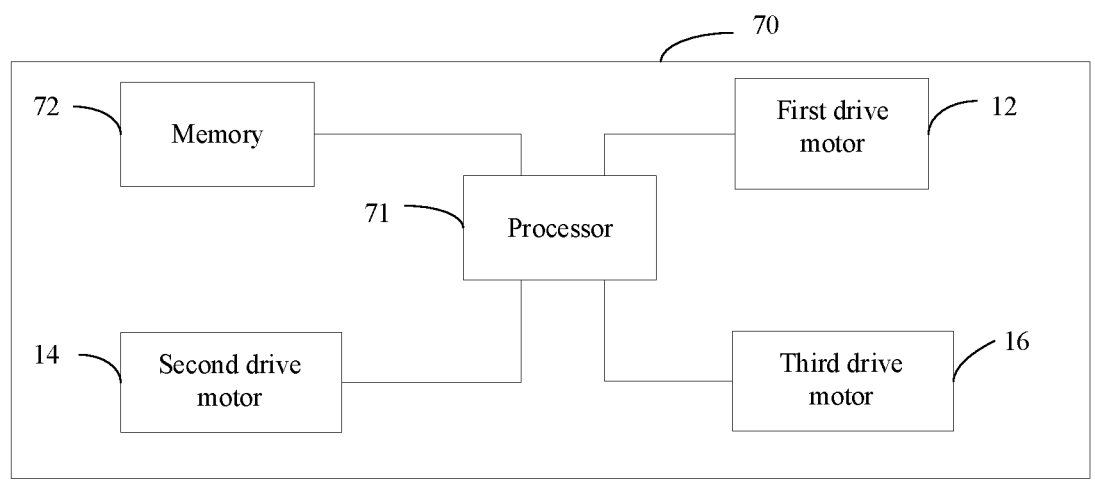
FIG. 7 is a schematic diagram of an electrical circuit configuration of a non-orthogonal gimbal according to an embodiment of the disclosure.

FIG. 7 is a schematic diagram of a circuit configuration of a non-orthogonal gimbal consistent with an embodiment of the disclosure. The structure of the non-orthogonal gimbal 70 can be similar to the gimbal shown in FIG. 1 and the description thereof is omitted. The non-orthogonal gimbal 70 includes a processor 71 and a memory 72. The processor 71 and the memory 72 can be arranged inside the non-orthogonal gimbal 70, such as at the base. The processor 71 of the non-orthogonal gimbal is coupled to the memory 72, the first drive motor 12, the second drive motor 14, and the third drive motor 16. In some embodiments, the processor 71 can be coupled to one or more of the first drive motor 12, the second drive motor 14, and the third drive motor 16 through one or more electronic speed controllers (ESCs), so as to control the corresponding drive motors through the corresponding one or more ESCs. In some other embodiments, the processor 71 of the non-orthogonal gimbal 70 may be coupled to at least some of the above electrical components through a bus.

The memory 72 may include a read-only memory or a random-access memory and provide instructions and data to the processor 71. A part of the memory 72 may also include a non-volatile random-access memory.

The above-described processor 71 may be a central processing unit (CPU), another general-purpose processor, a digital signal processor (DSP), an application-specific integrated circuit (ASIC), a field-programmable gate array (FPGA) or another programmable logic device, a discrete gate or transistor logic device, or a discrete hardware component, etc. The general-purpose processor may be a microprocessor, or any processor, etc.

The memory 72 is configured to store program instructions.

The processor 71 reads the program instructions, and the program instructions are executed to perform a method consistent with the disclosure, such as one of the example methods described above.

In some embodiments, the processor 71 is configured to obtain the actual attitude of the gimbal 70, determine the target attitude of the gimbal 70 according to the actual attitude of the gimbal 70 and the angle between the rotation axis of the first drive motor 12 and the rotation axis of the second drive motor 14, determine the attitude error according to the actual attitude of the gimbal 70 and the target attitude of the gimbal 70, and control the drive motors according to the attitude error to cause the actual attitude of the gimbal 70 to approach the target attitude of the gimbal.

In some embodiments, the target attitude includes the target pitch attitude.

To determine the target attitude of the gimbal according to the actual attitude of the gimbal 70 and the angle between the rotation axis of the first drive motor 12 and the rotation axis of the second drive motor 14, the processor 71 is further configured to determine the target pitch attitude according to the actual attitude of the gimbal 70, the joint angle of the third drive motor 16, and the angle between the rotation axis of the first drive motor 12 and the rotation axis of the second drive motor 14.

To control the drive motor to cause the actual attitude of the gimbal 70 to approach the target attitude of the gimbal according to the attitude error, the processor 71 is further configured to control the drive motor to cause the actual pitch attitude of the gimbal 70 to approach the target pitch attitude of the gimbal.

To determine the target pitch attitude according to the actual attitude of the gimbal 70, the joint angle of the third drive motor 16, and the angle between the rotation axis of the first drive motor 12 and the rotation axis of the second drive motor 14, the processor 71 is further configured to determine the actual attitude of the second axis arm according to the actual attitude of the gimbal 70 and the joint angle of the third drive motor 16 and determine the target pitch attitude of the gimbal 70 according to the actual attitude of the second axis arm and the angle between the rotation axis of the first drive motor 12 and the rotation axis of the second drive motor 14.

In some embodiments, the target attitude includes the target roll attitude.

To determine the target attitude of the gimbal according to the actual attitude of the gimbal 70 and the angle between the rotation axis of the first drive motor 12 and the rotation axis of the second drive motor 14, the processor 71 is further configured to determine the target roll attitude according to the actual attitude of the gimbal 70, the joint angle of the third drive motor, the joint angle of the second drive motor, and the angle between the rotation axis of the first drive motor 12 and the rotation axis of the second drive motor 14.

To control the drive motor to cause the actual attitude of the gimbal 70 to approach the target attitude of the gimbal according to the attitude error, the processor 71 is further configured to control the drive motor to cause the actual roll attitude of the gimbal 70 to approach the target roll attitude according to the attitude error.

To determine the target roll attitude according to the actual attitude of the gimbal 70, the joint angle of the third drive motor, the joint angle of the second drive motor, and the angle between the rotation axis of the first drive motor 12 and the rotation axis of the second drive motor 14, the processor 71 is further configured to determine the actual attitude of the partial axis arm of the first axis arm connected to the first drive motor according to the actual attitude of the gimbal 70, the joint angle of the third drive motor 16, the joint angle of the second drive motor 14, and the angle between the rotation axis of the first drive motor 12 and the rotation axis of the second drive motor 14. The target roll attitude is the roll attitude of the actual attitude of the partial axis arm.

In some embodiments, the target attitude includes the target yaw attitude.

To determine the target attitude of the gimbal according to the actual attitude of the gimbal 70 and the angle between the rotation axis of the first drive motor 12 and the rotation axis of the second drive motor 14, the processor 71 is further configured to determine the target yaw attitude of the gimbal according to the actual attitude of the gimbal 70, the joint angle of the third drive motor, the joint angle of the second drive motor, the joint angle of the first drive motor, and the angle between the rotation axis of the first drive motor 12 and the rotation axis of the second drive motor 14.

To control the drive motor to cause the actual attitude of the gimbal 70 to approach the target attitude of the gimbal 70 according to the attitude error, the processor 71 is further configured to control the drive motor according to the attitude error to cause the actual yaw attitude of the gimbal 70 to approach the target yaw attitude.

To determine the target yaw attitude of the gimbal according to the actual attitude of the gimbal 70, the joint angle of the third drive motor 16, the joint angle of the second drive motor 14, the joint angle of the first drive motor 12, and the angle between the rotation axis of the first drive motor 12 and the rotation axis of the second drive motor 14, the processor 71 is further configured to determine the actual attitude of the base of the gimbal 70 according to the actual attitude of the gimbal 70, the joint angle of the third drive motor, the joint angle of the second drive motor, the joint angle of the first drive motor, and the angle between the rotation axis of the first drive motor 12 and the rotation axis of the second drive motor 14. The target yaw attitude is the actual yaw attitude of the actual attitude of the base.

In some embodiments, to control the drive motor to cause the actual attitude 70 of the gimbal to approach the target attitude of the gimbal according to the attitude error, the processor 71 is further configured to determine the joint angle error of the drive motor according to the attitude error and control the drive motor to cause the actual attitude of the gimbal 70 to approach the target attitude according to the joint angle error.

In some embodiments, to determine the joint angle error of the drive motor according to the attitude error, the processor 71 is further configured to determine the joint angle error of the drive motor according to the attitude error and the angle between the rotation axis of the first drive motor 12 and the rotation axis of the second drive motor 14.

In some embodiments, to determine the joint angle error of the drive motor according to the attitude error and the angle between the rotation axis of the first drive motor 12 and the rotation axis of the second drive motor 14, the processor 71 is further configured to obtain the joint angles of the second drive motor 14 and the third drive motor 16, and determine the attitude error conversion parameter according to the joint angles of the second drive motor 14 and the third drive motor 16, and the angle between the rotation axis of the first drive motor 12 and the rotation axis of the second drive motor 14. The attitude error conversion parameter is used to convert the attitude error into the joint angle error, and the joint angle error is determined according to the attitude error conversion parameter and the attitude error.

In some embodiments, to determine the attitude error conversion parameter according to the joint angles of the second drive motor 14 and the third drive motor 16, and the angle between the rotation axis of the first drive motor 12 and the rotation axis of the second drive motor 14, the processor 71 is further configured to determine the joint angle error conversion parameter according to the joint angles of the second drive motor and the third drive motor 16, and the angle between the rotation axis of the first drive motor 12 and the rotation axis of the second drive motor 14. The joint angle error conversion parameter is used to convert the joint angle error into the attitude error, and the attitude error conversion parameter is determined according to the joint angle conversion parameter.

In some embodiments, the joint angle error conversion parameter includes a first joint angle error conversion parameter component, a second joint angle error conversion parameter component, and a third joint angle error conversion parameter component.

To determine the joint angle error conversion parameter according to the joint angles of the second drive motor 14 and the third drive motor 16, and the angle between the rotation axis of the first drive motor 12 and the rotation axis of the second drive motor 14, the processor 71 is further configured to determine the second joint angle error conversion parameter component according to the joint angle of the third drive motor 16, and determine the third joint angle error conversion parameter component according to the joint angle of the second drive motor 14, the joint angle of the third drive motor 16, and the angle between the rotation axis of the first drive motor 12 and the rotation axis of the second drive motor 14.

In some embodiments, when the joint angle of the third drive motor is at 0 position, the partial axis arm of the third axis arm that is connected to the third drive motor is orthogonal to the partial axis arm of the second axis arm that is connected to the third drive motor are orthogonal.

In some embodiments, the processor 71 is configured to obtain the actual attitude of the gimbal 70, determine the target attitude of the gimbal 70, determine the attitude error according to the actual attitude and the target attitude, and control the drive motor to cause the actual attitude of the gimbal 70 to approach the target attitude according to the attitude error, and the angle between the rotation axis of the first drive motor 12 and the rotation axis of the second drive motor 14.

In some embodiments, to control the drive motor to cause the actual attitude of the gimbal 70 to approach the target attitude according to the attitude error, the angle between the rotation axis of the first drive motor 12 and the rotation axis of the second drive motor 14, the processor 71 is further configured to determine the joint angle error of the drive motor according to the attitude error and the angle to cause the actual attitude of the gimbal 70 to approach the target attitude according to the attitude error and the angle between the rotation axis of the first drive motor 12 and the rotation axis of the second drive motor 14, and control the drive motor to cause the actual attitude of the gimbal to approach the target attitude according to the joint angle error.

In some embodiments, to determine the joint angle error of the drive motor according to the attitude error and the angle between the rotation axis of the first drive motor 12 and the rotation axis of the second drive motor 14, the processor 71 is further configured to obtain the joint angles of the second drive motor 14 and the third drive motor 16, and determine the attitude error conversion parameter according to the joint angles of the second drive motor 14 and the third drive motor 16, and the angle between the rotation axis of the first drive motor 12 and the rotation axis of the second drive motor 14. The attitude error conversion parameter is used to convert the attitude error into the joint angle error, and the joint angle error is determined according to the attitude error conversion parameter and the attitude error.

In some embodiments, to determine the attitude error conversion parameter according to the joint angles of the second drive motor 14 and the third drive motor 16, and the angle between the rotation axis of the first drive motor 12 and the rotation axis of the second drive motor 14, the processor 71 is further configured to determine the joint angle error conversion parameter according to the joint angles of the second drive motor 14 and the third drive motor 16, and the angle between the rotation axis of the first drive motor 12 and the rotation axis of the second drive motor 14. The joint angle error conversion parameter is used to convert the joint angle error into the attitude error, and the attitude error conversion parameter is determined according to the joint angle error conversion parameter.

In some embodiments, the joint angle error conversion parameter includes the first joint angle error conversion parameter component, the second joint angle error conversion parameter component, and the third joint angle error conversion parameter component.

To determine the joint angle error conversion parameter according to the joint angles of the second drive motor 14 and the third drive motor 16 and the angle between the rotation axis of the first drive motor 12 and the rotation axis of the second drive motor 14, the processor 71 is further configured to determine the second joint angle error conversion parameter component according to the joint angle of the third drive motor 16, and determine the third joint angle error conversion parameter component according to the joint angle of the second drive motor 14, the joint angle of the third drive motor, and the angle between the rotation axis of the first drive motor 12 and the rotation axis of the second drive motor 14.

In some embodiments, the target attitude includes the target pitch attitude.

To determine the target attitude of the gimbal 70, the processor 71 is configured to determine the target attitude of the gimbal 70 according to the actual attitude of the gimbal 70, the joint angle of the third drive motor, and the angle between the rotation axis of the first drive motor 12 and the rotation axis of the second drive motor 14.

To control the drive motor to cause the actual attitude of the gimbal 70 to approach the target attitude according to the attitude error, the angle between the rotation axis of the first drive motor 12 and the rotation axis of the second drive motor 14, the processor 71 is configured to control the drive motor to cause the actual pitch attitude of the gimbal 70 to approach the target pitch attitude of the gimbal according to the attitude error and the angle between the rotation axis of the first drive motor 12 and the rotation axis of the second drive motor 14.

To determine the target pitch attitude according to the actual attitude of the gimbal, joint angle of the third drive motor, and the angle between the rotation axis of the first drive motor 12 and the rotation axis of the second drive motor 14, the processor 71 is further configured to determine the actual attitude of the second axis arm according to the actual attitude of the gimbal, the joint angle of the third drive motor, and determine the target pitch attitude according to the actual attitude of the second axis arm and the angle between the rotation axis of the first drive motor 12 and the rotation axis of the second drive motor 14.

In some embodiments, the target attitude includes the target roll attitude.

To determine the target attitude of the gimbal 70, the processor 71 is further configured to determine the target roll attitude according to the actual attitude of the gimbal 70, the joint angle of the third drive motor 16, the joint angle of the second drive motor 14, and the angle between the rotation axis of the first drive motor 12 and the rotation axis of the second drive motor 14.

To control drive motor to cause the actual attitude of the gimbal 70 to approach the target attitude according to the attitude error, the angle between the rotation axis of the first drive motor 12 and the rotation axis of the second drive motor 14, the processor 71 is configured to control the drive motor to cause the actual roll attitude of the gimbal 70 to approach the target roll attitude of the gimbal according to the attitude error, and the angle between the rotation axis of the first drive motor 12 and the rotation axis of the second drive motor 14.

In some embodiments, to determine the target roll attitude according to the actual attitude of the gimbal 70, the joint angle of the third drive motor 16, the joint angle of the second drive motor 14, and the angle between the rotation axis of the first drive motor 12 and the rotation axis of the second drive motor 14, the processor 71 is configured to determine the actual attitude of the partial axis arm of the first axis arm connected to the first drive motor according to the actual attitude of the gimbal 70, the joint angle of the third drive motor 16, the joint angle of the second drive motor 14, and the angle between the rotation axis of the first drive motor 12 and the rotation axis of the second drive motor 14.

In some embodiments, the target attitude includes the target yaw attitude.

To determine the target attitude of the gimbal 70, the processor 71 is further configured to determine the target yaw attitude according to the actual attitude of the gimbal 70, the joint angle of the third drive motor 16, the joint angle of the second drive motor, the joint angle of the first drive motor, and the angle between the rotation axis of the first drive motor 12 and the rotation axis of the second drive motor 14.

To control the drive motor to cause the actual attitude of the gimbal 70 to approach the target attitude according to the attitude error and angle between the rotation axis of the first drive motor 12 and the rotation axis of the second drive motor 14, the processor 71 is further configured to control the drive motor to cause the actual yaw attitude of the gimbal 70 to the target yaw attitude according to the attitude error, and the angle between the rotation axis of the first drive motor 12 and the rotation axis of the second drive motor 14.

To determine the target yaw attitude according to the actual attitude of the gimbal 70, the joint angle of the third drive motor 16, the joint angle of the second drive motor 14, the joint angle of the first drive motor 12, and the angle between the rotation axis of the first drive motor 12 and the rotation axis of the second drive motor 14, the processor 71 is further configured to determine the actual attitude of the base of the gimbal 70 according to the actual attitude of the gimbal 70, the joint angle of the third drive motor 16, the joint angle of the second drive motor 14, the joint angle of the first drive motor 12, and the angle between the rotation axis of the first drive motor 12 and the rotation axis of the second drive motor 14. The target yaw attitude is the actual yaw attitude of the actual attitude of the base.

In some embodiments, when the joint angle of the third drive motor is at the 0 position, the partial axis arm of the third axis arm that is connected to the third drive motor is orthogonal to the partial axis arm of the second axis arm that is connected to the third drive motor.

In some embodiments, the device may be configured to implement the technical solutions of some embodiments of the present disclosure described above. The principles and technical effects are similar, which are not described here in detail.

In accordance with the disclosure, there is provided a control device of the non-orthogonal gimbal. As shown in FIG. 7, the control device includes the processor 71 and the memory 72. The control device is configured to control the attitude of the non-orthogonal gimbal described above. The processor 71 can run the program instructions stored in memory 72 to perform a method consistent with the disclosure, such as one of the example methods described above.

Figure 8:
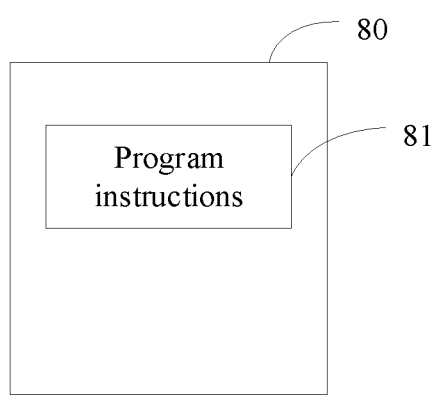
FIG. 8 is a schematic diagram of a storage device according to an embodiment of the disclosure.

FIG. 8 is a schematic structural diagram of a storage device consistent with an embodiment of the disclosure. In some embodiments, the memory 80 stores program instructions 81, and when the program instructions 81 are executed by a processor, the program instructions cause the processor to perform a method consistent with the disclosure, such as one of the example methods described above.

The memory 80 may be a medium that can store computer instructions, such as a USB flash drive, a portable hard drive, a read-only memory (ROM), a random access memory (RAM), a magnetic disc, a CD, etc., or a server storing the program instructions, and the server can send the stored program instructions to other devices for execution or execute the stored program instructions by itself.

In some embodiments, according to the attitude error between the actual attitude and the target attitude of the non-orthogonal gimbal, the drive motor of the non-orthogonal gimbal is controlled according to the attitude error to cause the actual attitude of the gimbal to approach the target attitude. That is, the attitude of the non-orthogonal gimbal is controlled by a closed-loop control method. Because the angle between the rotation axis of the first drive motor and the rotation axis of the second drive motor of the non-orthogonal gimbal is a non-right angle, the target attitude or the control value of the drive motor can be determined in conjunction with the angle to control the non-orthogonal gimbal accurately and effectively.

The embodiments of the disclosure, the methods and devices disclosed can be implemented in other forms. For example, the device embodiments described above are merely illustrative. For example, the division of the units is only a logical function division, and the actual implementation may be according to another division method. For example, multiple units or components can be combined or integrated into another system, or some features can be omitted or not be executed. Further, the displayed or discussed mutual coupling or direct coupling or communicative connection can be through some interfaces, the indirect coupling or communicative connection of the devices or units can be electronically, mechanically, or in other forms.

The units described as separate components may be or may not be physically separated, the components displayed as units may be or may not be physical units, which can be in one place or be distributed to multiple network units. Some or all of the units can be chosen to implement the purpose of the embodiment according to the actual needs.

In addition, in embodiments of the disclosure, individual functional units can be integrated into one processing unit, or can be individual units physically separated, or two or more units can be integrated into one unit. The integrated units above can be implemented by hardware, or can be implemented by hardware and software functional units.

The integrated units implemented by software functional units can be stored in a computer-readable storage medium. The above software functional units stored in a storage medium includes multiple instructions for a computing device (such as a personal computer, a server, or network device, etc.) or a processor to execute some of the operations in the embodiments of the disclosure. The storage medium includes USB drive, mobile hard disk, read-only memory (ROM), random access memory (RAM), disk or optical disk, or another medium that can store program codes.

The above-described embodiments of the present disclosure do not limit the scope of the present disclosure. Any equivalent structure or equivalent process transformation based on the specification and reference drawings of the present disclosure, or directly or indirectly used in other related technical fields, are within the scope of the present disclosure.

What is claimed is:

1. A control method for a non-orthogonal gimbal comprising:
    obtaining an actual attitude of the gimbal, the gimbal including a plurality of drive motors including a first drive motor, a second drive motor, and a third drive motor, and the gimbal further including a base, a first axis arm rotatably coupled to the base through the first drive motor, a second axis arm rotatably coupled to the first axis arm through the second drive motor, and a third axis arm rotatably coupled to the second axis arm through the third drive motor and configured to carry a load, the actual attitude including an actual pitch attitude, an actual roll attitude, and an actual yaw attitude;
    determining a target attitude of the gimbal according to the actual attitude of the gimbal and an angle between a first rotation axis of the first drive motor and a second rotation axis of the second drive motor, the angle between the first rotation axis and the second rotation axis being not a right angle, the target attitude including a target pitch attitude, a target roll attitude, and a target yaw attitude;
    determining an attitude error between the actual attitude and the target attitude, the attitude error including a pitch attitude error between the actual pitch attitude and the target pitch attitude, a roll attitude error between the actual roll attitude and the target roll attitude, and a yaw attitude error between the actual yaw attitude and the target yaw attitude; and
    controlling one or more of the plurality of drive motors according to the attitude error to cause the gimbal to approach the target attitude.

2. The method of claim 1, wherein:
    determining the target attitude includes determining the target pitch attitude according to the actual attitude of the gimbal, a joint angle of the third drive motor, and the angle between the first rotation axis and the second rotation axis; and
    controlling the one or more of the plurality of drive motors includes controlling the one or more of the plurality of drive motors according to the attitude error to cause the gimbal to approach the target pitch attitude.

3. The method of claim 2, wherein determining the target pitch attitude includes:
    determining an actual attitude of the second axis arm according to the actual attitude of the gimbal and the joint angle of the third drive motor; and
    determining the target pitch attitude according to the actual attitude of the second axis arm and the angle between the first rotation axis and the second rotation axis.

4. The method of claim 1, wherein:
    determining the target attitude includes determining the target roll attitude according to the actual attitude of the gimbal, a joint angle of the third drive motor, a joint angle of the second drive motor, and the angle between the first rotation axis and the second rotation axis; and
    controlling the one or more of the plurality of drive motors includes controlling the one of more of the plurality of drive motors according to the attitude error to cause the gimbal to approach the target roll attitude.

5. The method of claim 4, wherein determining the target roll attitude includes determining an actual attitude of a partial axis arm of the first axis arm according to the actual attitude of the gimbal, the joint angle of the third drive motor, the joint angle of the second drive motor, and the angle between the first rotation axis and the second rotation axis, the partial axis arm being connected to the first drive motor, and the target roll attitude being a roll attitude of the actual attitude of the partial axis arm.

6. The method of claim 1, wherein:
    determining the target attitude includes determining the target yaw attitude according to the actual attitude of the gimbal, a joint angle of the third drive motor, a joint angle of the second drive motor, a joint angle of the first drive motor, and the angle between the first rotation axis and the second rotation axis; and
    controlling the one or more of the plurality of drive motors includes controlling the one or more of the plurality of drive motors according to the attitude error to cause the gimbal to approach the target yaw attitude.

7. The method of claim 6, wherein determining the target yaw attitude includes determining an actual attitude of the base according to the actual attitude of the gimbal, the joint angle of the third drive motor, the joint angle of the second drive motor, and the angle between the first rotation axis and the second rotation axis, the target yaw attitude being a yaw attitude of the actual attitude of the base.

8. The method of claim 1, wherein controlling the one or more of the plurality of drive motors includes:
    determining a joint angle error of the one or more of the plurality of drive motors according to the attitude error; and
    controlling the one or more of the plurality of drive motors according to the joint angle error to cause the gimbal to approach the target attitude.

9. The method of claim 8, wherein determining the joint angle error includes determining the joint angle error according to the attitude error and the angle between the first rotation axis and the second rotation axis.

10. The method of claim 9, wherein determining the joint angle error according to the attitude error and the angle between the first rotation axis and the second rotation axis includes:
    obtaining a joint angle of the second drive motor and a joint angle of the third drive motor;
    determining an attitude error conversion parameter according to the joint angle of the second drive motor, the joint angle of the third drive motor, and the angle between the first rotation axis and the second rotation axis; and
    determining the joint angle error according to the attitude error conversion parameter and the attitude error.

11. The method of claim 10, wherein determining the attitude error conversion parameter includes:
    determining a joint angle error conversion parameter according to the joint angle of the second drive motor, the joint angle of the third drive motor, and the angle between the first rotation axis and the second rotation axis; and
    determining the attitude error conversion parameter according to the joint angle error conversion parameter.

12. The method of claim 11, wherein:
    the joint angle error conversion parameter includes a first joint angle error conversion parameter component, a second joint angle error conversion parameter component, and a third joint angle error conversion parameter component; and determining the joint angle error conversion parameter includes:
  determining the second joint angle error conversion parameter component according to the joint angle of the third drive motor; and
  determining the third joint angle error conversion parameter component according to the joint angle of the second drive motor, the joint angle of the third drive motor, and the angle between the first rotation axis and the second rotation axis.

13. The method of claim 1, wherein:
  when a joint angle of the third drive motor is at a zero position, a part of the third axis arm that is connected to the third drive motor and a part of the second axis arm that is connected to the third drive motor are orthogonal to each other.

14. A non-orthogonal gimbal comprising:
  a plurality of drive motors including a first drive motor, a second drive motor, and a third drive motor;
  a base;
  a first axis arm rotatably coupled to the base through the first drive motor, the first drive motor having a first rotation axis;
  a second axis arm rotatably coupled to the first axis arm through the second drive motor, the second drive motor having a second rotation axis being non-orthogonal to the first rotation axis;
  a third axis arm rotatably coupled to the second axis arm through the third drive motor;
  a memory storing program instructions; and
  a processor configured to execute the program instructions to:
    obtain an actual attitude of the gimbal, the actual attitude including an actual pitch attitude, an actual roll attitude, and an actual yaw attitude;
    determine a target attitude of the gimbal according to the actual attitude of the gimbal and an angle between the first rotation axis and the second rotation axis, the target attitude including a target pitch attitude, a target roll attitude, and a target yaw attitude;
    determine an attitude error between the actual attitude and the target attitude, the attitude error including a pitch attitude error between the actual pitch attitude and the target pitch attitude, a roll attitude error between the actual roll attitude and the target roll attitude, and a yaw attitude error between the actual yaw attitude and the target yaw attitude; and
    control one or more of the plurality of drive motors according to the attitude error to cause the gimbal to approach the target attitude.

15. The gimbal of claim 14, wherein the processor is further configured to execute the program instructions to:
  determine the target pitch attitude according to the actual attitude of the gimbal, a joint angle of the third drive motor, and the angle between the first rotation axis and the second rotation axis; and
  control the one or more of the plurality of drive motors according to the attitude error to cause the gimbal to approach the target pitch attitude.

16. The gimbal of claim 15, wherein the processor is further configured to execute the program instructions to:
  determine an actual attitude of the second axis arm according to the actual attitude of the gimbal and the joint angles of the third drive motor; and
  determine the target pitch attitude according to the actual attitude of the second axis arm and the angle between the first rotation axis and the second rotation axis.

17. The device of claim 14, wherein the processor is further configured to execute the program instructions to:
  determine the target roll attitude according to the actual attitude of the gimbal, a joint angle of the third drive motor, a joint angle of the second drive motor, and the angle between the first rotation axis and the second rotation axis; and
  control the one or more of the plurality of drive motors according to the attitude error to cause the gimbal to approach the target roll attitude.

18. The device of claim 17, wherein the processor is further configured to execute the program instructions to:
  determine an actual attitude of a partial axis arm of the first axis arm according to the actual attitude of the gimbal, the joint angle of the third drive motor, the joint angle of the second drive motor, and the angle between the first rotation axis and the second rotation axis, the partial axis arm being connected to the first drive motor, and the target roll attitude being a roll attitude of the actual attitude of the partial axis arm.

19. The device of claim 14, wherein the processor is further configured to execute the program instructions to:
  determine the target yaw attitude according to the actual attitude of the gimbal, a joint angle of the third drive motor, a joint angle of the second drive motor, a joint angle of the first drive motor, and the angle between the first rotation axis and the second rotation axis; and
  control the one or more of the plurality of drive motors according to the attitude error to cause the gimbal to approach the target yaw attitude.

20. The device of claim 19, wherein the processor is further configured to execute the program instructions to:
  determine an actual attitude of the base according to the actual attitude of the gimbal, the joint angle of the third drive motor, the joint angle of the second drive motor, and the angle between the first rotation axis and the second rotation axis, the target yaw attitude being a yaw attitude of the actual attitude of the base.

* * * * *